Jan. 19, 1971 J. R. GREEN ET AL 3,556,922
FIBER-RESIN COMPOSITE OF POLYAMIDE AND INORGANIC FIBERS
Filed Aug. 27, 1968 2 Sheets-Sheet 1

INVENTORS
JAMES R. GREEN
JOSEPH T. RIVERS, JR.
DONALD L. G. STURGEON

Eugene Berman
AGENT

United States Patent Office 3,556,922
Patented Jan. 19, 1971

3,556,922
FIBER-RESIN COMPOSITE OF POLYAMIDE AND INORGANIC FIBERS
James R. Green, Wilmington, Del., Joseph T. Rivers, Jr., West Chester, Pa., and Donald L. G. Sturgeon, Wilmington, Del., assignors to E. I. du Pont de Nemours and Company, Wilmington, Del., a corporation of Delaware
Filed Aug. 27, 1968, Ser. No. 755,655
Int. Cl. B32b 5/28, 5/14
U.S. Cl. 161—156      12 Claims

ABSTRACT OF THE DISCLOSURE

A fiber-resin composite is disclosed containing carbocyclic aromatic polyamide fibers and inorganic fibers. The inorganic fibers are located within the portions of the composite which will be subjected to compressive stress, e.g., these fibers are located within the composite where they will be subjected to compression along their axes when the composite is loaded. Particular flexural properties of the composite are significantly improved compared to composites containing either the polyamide fibers or the inorganic fibers.

SPECIFICATION

This invention relates to fiber-resin composites. More specifically, it relates to an improved composite containing carbocyclic aromatic polyamide fibers and inorganic fibers.

BACKGROUND OF THE INVENTION

Fibrous-reinforced resins are an old and important part of our technology. Great advances in this area have been made in recent years in response to the demands for lighter, stronger, and stiffer materials of construction by aircraft and aerospace designers. New high strength, high modulus fibers have been developed. A recent review in this area is "Survey of Ceramic Fibers and Fibrous Composite Materials" by H. W. Rauch et al., Technical Report AFML–TR–66–365 (October 1966). One great drawback of new fibers such as ceramics, graphite, boron, etc., is their extreme high cost.

The use of simple composites of poly(p-benzamide) fibers and resins is shown in French Pat. 1,526,745. The flexural stress at useful moduli of these and similar composites is improved upon by the products of this invention.

SUMMARY OF THE INVENTION

The present invention provides composites comprised of at least about 10 volume percent of a resin, high strength, high modulus carbocyclic aromatic polyamide fibers and high strength, high modulus inorganic fibers; the inorganic fibers are located within at least a portion of the composite which will be subjected to compressive stress, e.g., these fibers are subjected to compression along their axes when the composite is loaded. The polyamide fibers/inorganic fibers (volume/volume) ratio should preferably be about 4:1 to 30:1 to achieve the most significant improvement provided by this invention. The fiber ratio is most preferably about 5:1 to 11:1. The composites are preferably comprised of from about 10 to 50 volume percent (most preferably 20 to 40 volume percent) of a resin, from about 38 to 88 volume percent (most preferably 50 to 80 volume percent) of carbocyclic aromatic polyamide fibers and from about 2 to 12 volume percent (most preferably 3 to 10 volume percent) of inorganic fibers as hereinafter described.

It will be understood that conventional additives such as dyes, fillers, UV stabilizers, antioxidants, etc., can be incorporated in the fibers, the resin and/or the composite; coatings, sizes, dips, etc., can be applied to the fiber surface; and modifications can be made to the surface of the fibers, e.g., "whiskerizing of graphite," for the purposes intended prior to the preparation thereof.

The composite structures of this invention show a surprising increase in flexural strength as compared with structures of fibers of a carbocyclic aromatic polyamide or the inorganic material.

The introduction of relatively small amounts of inorganic fibers (a polyamide fiber/inorganic fiber volume ratio of about 4:1 to 30:1), into only a part of the portion of composite which will be subjected to compression quite surprisingly increases the break tangent modulus and the flexural strength of the composite at useful moduli (greater than about $4.0 \times 10^6$ p.s.i.). This result is most clearly seen when about 2 to 12 volume percent of the inorganic fiber is used together with at least about 38 volume percent of the polyamide fibers. More than about 12 volume percent of the inorganic fiber (at a given polyamide fiber level at least about 38 volume percent and at approximately the same total fiber content) does not further significantly increase the break tangent modulus of the composite and undesirably increases the basis weight of the composite due to the inorganic fibers (the density of the inorganic fibers is usually higher than that of the polyamide fibers).

Preferred products of the invention have a flexural strength of at least 150,000 pounds/in.$^2$ (p.s.i.) and a flexural modulus of at least $12 \times 10^6$ p.s.i. It will be understood that the absolute values attained are dependent upon the carbocyclic aromatic polyamide and the inorganic fibers used, the orientation in the structure, the length and volume percent of the fibers, and to a lesser extent upon the type of resin used and the molding technique used.

DESCRIPTION OF THE DRAWINGS

The invention will be better understood by reference to the drawings wherein.

MORE DETAILED DESCRIPTION OF THE INVENTION

Carbocyclic aromatic polyamide fibers

Figure 1:
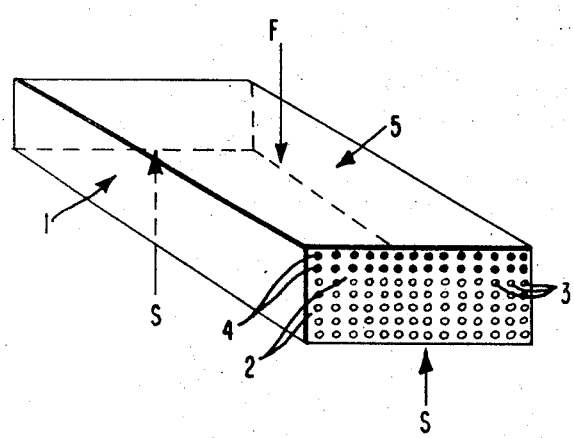
FIG. 1 illustrates a composite product of this invention in the form of a rectangular bar.

The carbocyclic aromatic polyamide fibers used in this invention should have a tenacity of at least 10 grams per denier (g.p.d.), (preferably at least 14 g.p.d.), a tensile modulus of at least 600 g.p.d., (preferably at least 800), and an orientation angle less than about 45° preferably less than 35°.

Suitable carbocyclic aromatic polyamides are those in which the chain extending bonds from each aromatic nucleus are essentially coaxial or parallel and oppositely directed. Such polyamides are characterized by recurring units of the Formula I or II and copolymers containing recurring units of Formulae I and II.

In the Formula I $$\left[ -\overset{O}{\underset{\|}{C}}-R-\overset{O}{\underset{\|}{C}}-\overset{H}{\underset{|}{N}}-R'-\overset{H}{\underset{|}{N}}- \right]$$

R and R' (when the chain extending bonds are essentially coaxial) are selected from the group of:

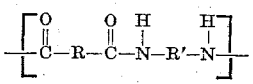
1,4-phenylene

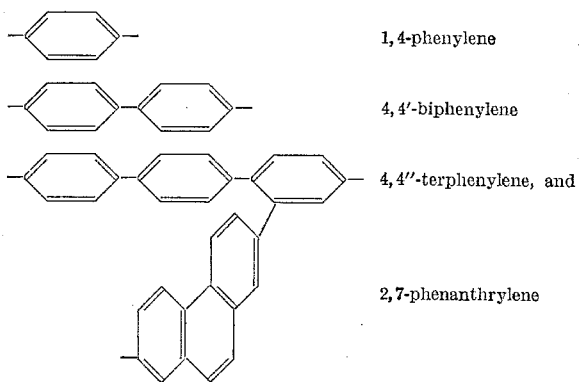
4,4'-biphenylene 4,4''-terphenylene, and 2,7-phenanthrylene and R and R' (when the chain extending bonds are essentially parallel) are selected from the group of:

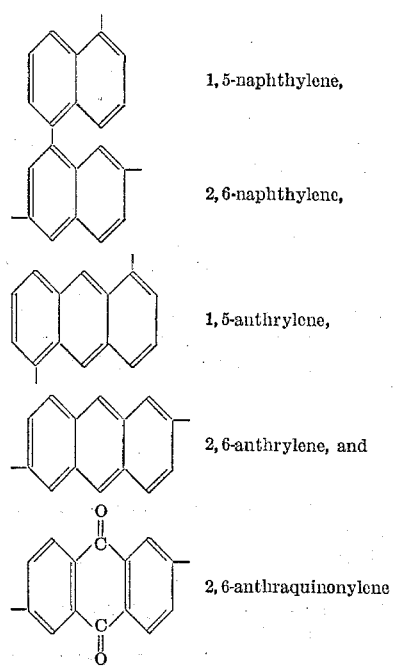
1,5-naphthylene, 2,6-naphthylene, 1,5-anthrylene, 2,6-anthrylene, and 2,6-anthraquinonylene R and R' may be the same or different and many contain substituents (e.g., chloro, methyl, or methoxy) on the aromatic neuclei.

Additional polyamides are characterized by recurring units of the formula:

(II)
$$\left[ -\overset{O}{\underset{\|}{C}}-R''-\overset{H}{\underset{|}{N}}- \right]$$

wherein R'' is selected from the group of:

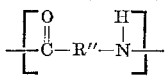
1,4-phenylene

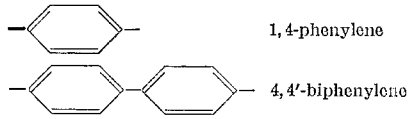
4,4'-biphenylene

Similarly R'' may contain substituents (e.g., methyl) on the aromatic nuclei.

Copolymers (random or ordered) containing recurring units of both Formula I and II are also well suited for fibers to be used in this invention. By the term "random" is meant that the copolymer consists of molecules containing large numbers of units comprised of two or more different types in irregular sequence. The units may be of AB, e.g., from p-aminobenzoyl chloride hydrochloride (a), AA, e.g., p-phenylenediamine (b), or BB, e.g., from terephthaloyl chloride (c), or 4,4'-dibenzoyl chloride (d) type or mixtures of these, provided always that the requirements of stoichiometry for high polymer formation are met. It is not necessary that the relative numbers of the different types of the unit be the same in different molecules or even in different portions of a single molecule. Random copolymers from combinations of (a), (b) and (c) and (a), (b) and (d) are especially useful.

While the polymer chains described above are comprised primarily of amide links (—CONH—) and aromatic ring nuclei as described above, useful polymers may also comprise up to about 10% (mole basis) of units not conforming to the above-cited description, e.g., aromatic polyamide-forming units whose chain extending bonds are other than coaxial or parallel and oppositely directed, e.g., they may be meta-oriented, or of linkages other than amide, e.g., urea or ester groups.

Among the suitable aromatic polyamides may be named poly(p-benzamide); poly(p-phenylene terephthalamide); poly(2-chloro-p-phenylene terephthalamide); poly(2,6-dichloro-p-phenylene 2,6-naphthalamide); poly(p-phenylene p,p'-biphenyldicarboxamide); poly(p-p'-phenylene benzamide); poly(1,5-naphthylene terephthalamide); ordered aromatic copolyamides such as e.g., copoly(p,p'-diaminobenzanilide terephthalamide), and random copolyamides such as, e.g., copoly(p-benzamide/m-benzamide) (95/5); and many others.

It is to be understood that the designation of position locations of substituent groups on the aromatic nuclei of the polymers useful in this invention refers to the location(s) of the substituent(s) on the diamine, diacid, or other reactants from which the polymer is prepared.

Polyamides, as described above, having an inherent viscosity of at least about 1.0, and preferably greater than about 1.5, as measured in a solution of 0.5 gram of polymer in 100 ml. of 95–98% sulfuric acid at 30° C. are preferred.

The carbocyclic aromatic polyamides are conveniently made by polymerization in a solution at low temperatures, i.e., under 60° C. and preferably from —15° C. to +30° C., using external cooling if necessary. The procedures in Kwolek et al. U.S. Pat. 3,063,966, and French Pat. 1,526,745 granted Apr. 16, 1968, may be used.

The preparation of spinning solutions from isolated polymer and even more preferably the preparation of a spinning solution directly from the solution polymerization reaction products (without isolating the polymer) is taught in French Pat. 1,526,745, as well as the spinning of fibers and the desirable heat treatment of the fibers. The preparation of carbocyclic aromatic polyamides and their fibers is not a part of this invention.

A typical preparation of a suitable polymer and fiber as illustrated by poly(p-benzamide) is as follows:

Three liters of N,N-dimethylacetamide are added to a resin kettle equipped with a high-shear impeller mixing device and swept with a stream of dry nitrogen. While the impeller is rotated at low speed, the amide is cooled to —10° C. by immersing the kettle in a bath of solid carbon dioxide and methanol. The impeller speed is then increased to about 4,000 revolutions per minute (r.p.m.) and p-aminobenzoyl chloride hydrochloride (308 g.) is added as quickly as possible. After five minutes, the stirrer speed is reduced to about 2,000 r.p.m. Eight minutes after the monomer is added, the solution is transferred to another closed resin kettle, which is swept with a stream of dry nitrogen and immersed in an ice-water bath. The contents of the kettle are gently stirred with a cage-type stirrer driven by an air motor and, after 30 minutes, the ice bath is replaced with a water bath (27° C.). An hour later, this bath is replaced with a bath of hot water (57° C.). During this time, the solution viscosity increases and the air pressure is increased to maintain a stirrer speed of 200–300 r.p.m. After the hot water bath is in place for about 50 minutes, an electric motor is coupled to the air motor to provide increased stirring. The hot water bath is replaced with a bath of ice water, after which 113 g. of lithium carbonate are added to the vigorously stirred contents of the kettle to neutralize the acidic by-products. The electric motor is uncoupled after about 0.5 hour and after an additional 1.5 hours, the ice water is replaced with cold water; stirring is continued for 16 hours.

The above dope, which contains about 6 weight percent of the polyamide and about 4 weight percent of lithium chloride, is placed in a 10-liter vessel and degassed with a vacuum pump. The dope is pumped through a spinneret having 580 holes of 0.003 inch diameter, into a water bath maintained at 70° C. The emerging filaments are passed over an underwater roller, through a transverse guide, and are wound up on a bobbin at a maximum speed of 180 ft./min. The rotating bobbin is washed with a spray of water (95° C.).

A sample of the washed and dried yarn, maintained under 250 g. tension, is passed at the rate of 50 ft./min. through a hot stainless steel tube, 40 in. length and 0.29 in. inside diameter, under a nitrogen atmosphere, having a hot nitrogen stream piped into its center and out through its ends. The temperature profile in this tube is given below.

| Distance from entrance, in.: | Temperature, ° C. |
| --- | --- |
| 2 | 339 |
| 6 | 518 |
| 10 | 544 |
| 14 | 554 |
| 18 | 559 |
| 20 | 554 |
| 22 | 572 |
| 26 | 578 |
| 30 | 571 |
| 34 | 520 |
| 38 | 226 |

Typical yarn properties after heat treatment are 17 grams/denier tenacity, 2.0% elongation, 1200 grams/denier initial modulus, $320 \times 10^3$ p.s.i. tensile strength, $22.5 \times 10^6$ p.s.i. tensile modulus, 1.1 denier/filament, an inherent viscosity of 4.5 and an orientation angle of 10°. Fibers of this type are used in the examples.

Inorganic fibers

The phrase "inorganic fibers" as used herein includes fibrous elements such as: ceramic fibers made of glasses, oxides, borides, carbides; graphite fibers, nitride fibers, metal fibers (e.g., steel piano wire) and fibers of intermetallics. Suitable fibers will have a tensile strength of at least 50,000 p.s.i. (preferably at least 100,000 p.s.i.) and tensile modulus of at least $10 \times 10^6$ p.s.i. The fibers are preferably in the form of continuous filaments although discontinuous length fibers and even short, single crystal particles or fibrous elements having a minimum length to a maximum average transverse dimension of 10:1 termed "whiskers" can be used.

Resins

All manner of resins may be used including thermoplastic resins such as nylons, polystyrene, styrene-acrylonitrile and polycarbonate and the thermosetting resins such as epoxides, polyesters (cross-linkable), phenolics, polyimides, melamine, silicones, and diallyl phthalate. Thermosetting resins are preferred for the high performance products of this invention. Suitable resins are well known and discussed in such books as "Modern Plastics Encyclopedia for 1968." Most preferred for use in the present invention are the synthetic resins which are amorphous, organic materials produced by the union (polymerization or condensation) of a large number of molecules of a relatively simple compound or compounds. A single resin or mixtures of suitable resins may be used.

Process considerations

In general any of the well-known techniques of this art can be used. To achieve maximum properties in these products, the resin must penetrate the entire mass of the fibers and "wet" every fiber and yet be substantially uniformly distributed throughout the composite. Therefore, with the resin loadings of about 10 to 50 volume percent used with these products, it is preferred that the fibers be impregnated with resin before laying-up in the mold.

The fibers can be impregnated by passing through a liquid resin bath before layup in the wet state. Another means of impregnation is by pre-impregnating fibers, tapes of parallel fibers, or woven fabrics with either (1) molding resins that can be advanced to a B-stage or partially polymerized such as phenolics, or (2) solutions or resins such as epoxies and then partially polymerizing or drying the prepreg. In this state the prepreg can be stored for reasonable length of time before being assembled in the final composite and the resin completely cured at elevated temperature. The use of prepregs is especially advantageous with relatively brittle and expensive inorganic fibers.

The impregnated fibers are generally laid-up in a matched metal die or wound on mandrels by hand or by machine to achieve the optimum orientation of all layers of fibers. The inorganic fibers are placed in the composite at those locations where a "priori" stress analysis (a technique well understood in the art) indicated the larger compressive stresses will occur when the composite is loaded.

In the simple case of a composite in the shape of a rectangular bar as shown in FIG. 1, the inorganic fibers 4 are embedded in resin 2 within the composite 1 adjacent to the upper face 5 where the maximum compressive stresses are produced by the force F applied while the composite is supported (as shown by the arrows labeled S). The carbocyclic aromatic polyamide fibers 3 lie in planes within the composite beneath the planes formed by the inorganic fibers 4, fibers 3 and 4 both being uniaxially oriented. The positioning of these inorganic fibers within the cross-section of the composite at the locations or portions thereof which are subjected to larger compressive forces is important to achieve the objects of the present invention; random intermixture of these inorganic fibers and the carbocyclic aromatic polyamide fibers in the resin does not result in the unexpected increase in flexural strength provided by the present invention.

Figure 2:
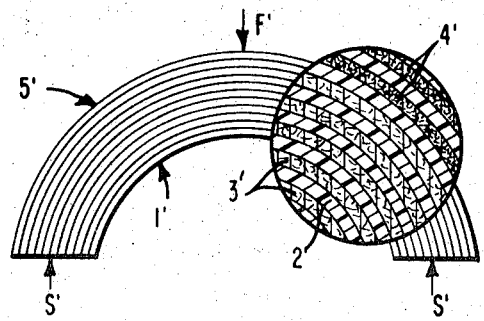
FIG. 2 illustrates another composite of this invention in the form of an arch.

Although the fibers shown in FIG. 1 are located in essentially parallel planes in the composite, this is not necessarily true in composites not in the form of rectangular bars. The positioning of the inorganic fibers in other structural forms (e.g., arches, sheets, plates, curved shells, airfoils or propellers) is determined by "a priori" stress analysis, as discussed above. For example, in an arch as shown in FIG. 2, the inorganic fibers 4' are embedded in resin 2' within the composite 1' adjacent to the surface 5' where the maximum compressive stresses are produced by the applied force F' while the composite is supported (as shown by the arrows labeled S'). The carbocyclic aromatic polyamide fibers 3' lie along curved surfaces parallel to surface 5' and do not lie in planes. The portions of composite 1' which are subjected to large compressive stress due to F' (as determined by "a priori" stress analysis) are reinforced by the inorganic fibers 4'.

The portions of a composite (of a given shape) under compressive stress is determined and the inorganic fibers are positioned according to this determination such that they will be subjected to axial compression where the composite is loaded. Positioning of the inorganic fibers and the polyamide fibers such that their fibers axes are within 0 to 90° (preferably 0 to 45°) of a common axis is preferred for particular composites; it is preferred that the fibers axes be substantially uniaxially oriented.

The amounts of the fibers may be controlled by weighing or metering their lengths. The amount of resin is conveniently controlled by using an excess and then molding with shims or bag molding to extrude excess resin.

The composites of this invention are advantageous when forming the skins of flat or curved sandwich structures with a honeycomb core.

Testing procedures

The American Society for Testing and Materials (ASTM) test method D790–66 (Procedure A) is used for testing flexural properties with the modification that a 4.0 inch span is used with samples 0.10 to 0.15 inch thick by 0.5 inch wide. The loading nose (0.125 inch radius) is operated at a crosshead rate of 0.05 inch/minute. All samples are oriented with the inorganic fiber side (when present) facing the loading nose.

*Flexural strength* or *ultimate flex strength* (p.s.i.) is equal to the maximum stress in the outer fiber at the moment of break and is calculated by Equation 3 of ASTM D790–66.

*Specific flexural strength* (inches) is the flexural strength (p.s.i.) divided by the density (pounds/inch$^3$) of the sample.

*Flexural modulus* (p.s.i.) as used herein is obtained by drawing a tangent to the steepest initial straight-line portion of the load deformation curve and applying Equation 5 of ASTM D790–66.

*Proportionality limit* (p.s.i.) is the stress calculated using the largest load on the steepest initial straight-line portion of the load-deformation curve and Equation 3 of ASTM D790–66. It is observed that for some composites the proportionality limit is the same as flexural strength indicating no yield from the initial straight-line.

*Modulus at break* or *break tangent modulus* (p.s.i.) is obtained in a manner similar to that used to calculate the flexural modulus but using a tangent to the load-deformation curve just prior to the break.

Values of flexural strength within parentheses in the examples indicate that they were calculated as above using the stress at a point on the load-deformation curve where the tangent modulus as defined in ASTM E6–66 is about $4.0 \times 10^6$ p.s.i. These values indicate the flexural strength at a useful modulus (i.e., $4.0 \times 10^6$ p.s.i.).

*Maximum flexural strain* at break (percent) is calculated by Equation 4 of ASTM D790–66 and is expressed as 100 (inch/inch).

*Orientation angles* of the carbocyclic aromatic polyamide fibers are measured as described in French Pat. 1,526,745.

EXAMPLES

The invention is further illustrated by the following examples.

EXAMPLE 1

This example shows the preparation of composites with boron fibers and epoxy resins.

An open-end Teflon®-coated double mold having a cross-section of an I beam is used. Boron fibers of 0.004 inch diameter, a minimum tensile strength of at least 400,000 p.s.i. and a tensile modulus of about $55 \times 10^6$ p.s.i., (Borofil® fibers made by the vapor deposition of boron on a tungsten wire by Texaco Experiment, Inc. of Richmond, Va.) are used. The fibers are cut to the length of the mold and fastened to the inner faces of the 2 cavities by means of an adhesive at the ends of the mold so that the fibers are parallel with the length of the mold.

A continuous length of yarn containing 580 continuous fibers of poly(p-benzamide) is conducted through a tensioning device which causes the fibers to separate due to static charges and then through a bath of resin, and through wiping blades to remove some resin. The fiber, wet with resin is wound around the length of the mold by rotating the mold on an axis transverse to its length so as to place the fibers against the boron fibers parallel to the length of the mold by means of a traversing device. Male parts of the mold are then fitted into the 2 cavities of about 0.5 inch width and fastened by screws to the desired pressure. This extrudes excess resin and assures penetration of the boron fibers by the resin.

The resin used is an epoxy type ERRA 4205 [a bis-(2,3-epoxy cyclopentyl)ether, solid and liquid isomer mixture made by the Union Carbide Co.] and is mixed with 28.4 parts by weight of m-phenylene diamine for 100 parts of the resin by weight. This resin is referred to hereinafter as Type A.

The mold and its contents is heated for 16 hours at 90° C., then 4 hours at 160° C. and finally for 16 hours at 205° C. The 2 male parts of the mold are removed and the 2 ends of the poly(p-benzamide)-resin composite cut to yield 2 molded bars. The curved ends of the bars are cut to give 2 composites with the boron-resin composite on opposite faces (as molded).

Products made by this method are shown as items *b* and *c* in Table I. A control is made without boron filaments in the same manner and shown as item *a*. Another (item *d*) is made with only boron fibers and a similar resin by hand laying resin and mold-length fibers in a single cavity mold, and curing.

The realized value of 227,000 p.s.i. is very unexpected. It should be noted that the specific flexural strength (in inches) of items *b* and *c* exceeds that of the boron-resin composites (item *d*).

Item *h* and the poly(p-benzamide) control item *g* are made in a similar manner using 100 parts of a bisphenol. A diglycidyl ether (EPON 826 by Shell Chemical Co.) resin and 13 parts of m-phenylene diamine with a curing cycle of 2 hours at 80° C. and then 2 hours at 150° C. This resin is referred to hereinafter as Type C.

A 580 filament yarn of poly(p-benzamide) is run through a solution of 100 parts of an epoxide resin—tetrakis (p-hydroxy phenyl)ethane tetraglycidyl ether (EPON 1031 by Shell Chemical Co.), 2 parts of ethyl amine-boron trifluoride complex ($CH_3CH_2NH_2 \cdot BF_3$) as a catalyst and 100 parts of methyl ethyl ketone as a solvent, the excess solution removed, the impregnated fibers skeined, dried overnight at room temperature, and then dried in a circulating air oven for ten minutes at 100° C. This resin is refered to hereinafter as Type B. The prepreg fibers are cut to mold length, hand laid in a single cavity, Teflon®-coated, mold on top of a layer of parallel boron fibers and cured 1 hour at 160° C. and 6 hours at 205° C. to make item *f*. Item *e* is made by the same technique without the outside layer of boron fibers and resin.

Figure 3:
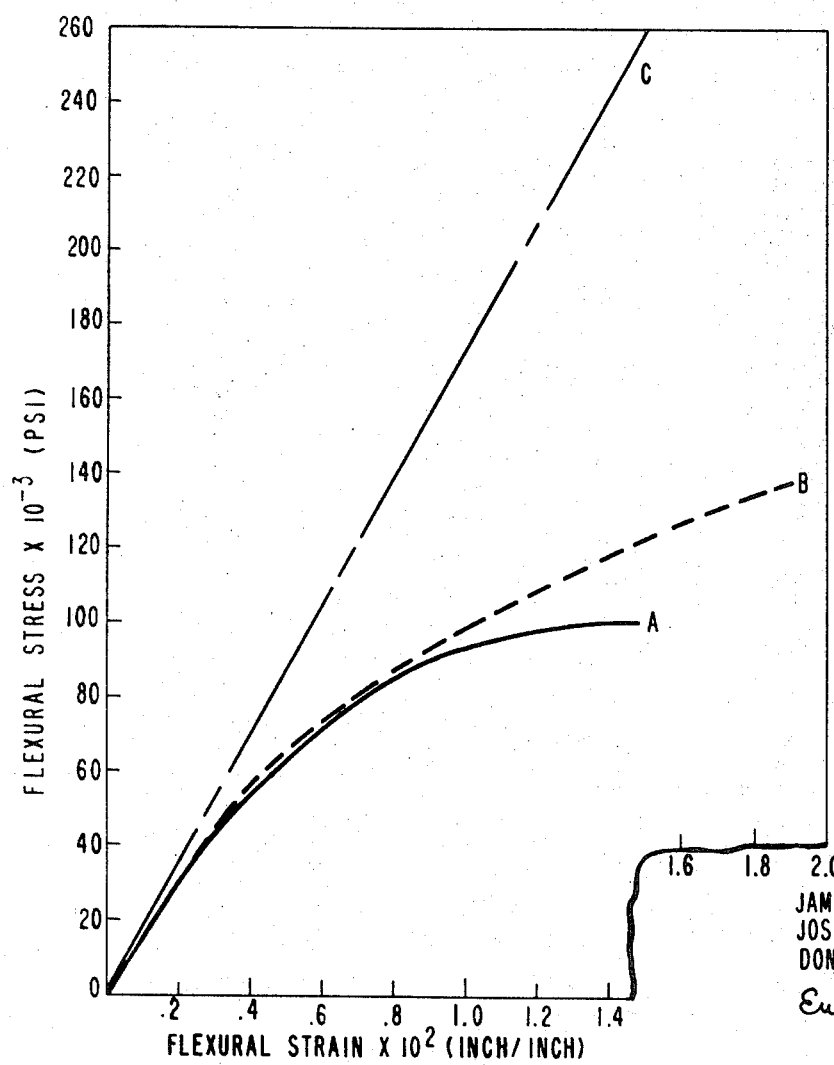
FIG. 3 illustrates typical load-deformation curves (flexural stress v. flexural strain) of fiber reinforced resin composites.

The properties of all products are given in Table I. Typical load-deformation curves (flexural stress vs. flexural strain) are shown in FIG. 3 wherein curve A is determined upon item *a*, curve C is determined upon item *c* and curve B is determined upon a 4% glass fiber composite similar to those shown in Example 2. The densities are calculated from the known compositions.

Similar results are obtained using 250 parts of a thermosetting polyester resin (Atlac 382–05A by Atlas Chemical Co.), 2.5 parts of 6% cobalt napthenate and 7 parts of a 60% solution of the methyl ethyl ketone peroxide in dimethyl phthalate using a curing cycle of 20 hours at 30° C. and 1 hour at 100° C.

Prepregs are made from the above fibers by impregnating with about a 30% solution of an "A" stage resol in methanol, wiping off excess solution and drying 20 hours at room temperature. The sticky prepreg fibers are cut to mold length, molded and cured in a single cavity mold provided with bleed cavities and pressurized in a vacuum bag for 20 hours at 90° C., plus 6 hours at 120° C. and 18 hours at 180° C. The presence of the top layer of inorganic fibers provides an unexpected improvement in flexural strength.

EXAMPLE 2

This example illustrates the use of continuous length glass fibers as the inorganic fiber in this invention.

Using the epoxide resin/catalyst (Type A) of item $a$ of Example 1, items $b$, $c$, and $d$ of the example are made using continuous glass fibers (Fiberglas® ECK 37 1/0 by Owens Corning, with a diameter of 0.0005 inch, a tensile strength of 500,000 p.s.i. and a tensile modulus of $10.5 \times 10^6$ p.s.i.) and the technique of items $a$–$d$ of Example 1.

Using the prepreg technique and resin of item $f$ of Example 1 items $e$ and $f$ of the Example are made with continuous glass fibers of similar strength and a diameter of 0.00036 inch (Fiberglas® ECG 150 4/5 by Owens Corning) and item $g$ with poly(p-benzamide) fibers alone. Item $a$ of this example is the same as item $a$ of Example 1.

The results are presented in Table II. Although item $b$ contains only 2.1 volume percent of the glass fibers, it shows an unexpected increase in flexural strength. Items $c$ and $f$, are preferred products.

The substitution of a stronger glass fiber (S Glass by Owens Corning with a tensile strength of 650,000 p.s.i. and a tensile modulus of $12.4 \times 10^6$ p.s.i.) in item $b$ using 63.3 volume percent poly(p-benzamide) fibers and 3.4 volume percent glass fibers gives a product with a flexural strength of about 130,000 p.s.i. at a break modulus of about $4 \times 10^6$ p.s.i.

EXAMPLE 3

This example illustrates the use of continuous length graphite fibers as the inorganic fiber in this invention.

Composites (items $b$ and $c$ of this example) are made using the epoxide resin and wet layup technique of item $b$ of Example 1 but using continuous lengths of graphite fibers (Thornel® 25 graphite yarn by Union Carbide Corporation, with a tensile strength of 180,000 p.s.i. and a tensile modulus of $25 \times 10^6$ p.s.i.). Item $a$ of this example is the same as item $a$ of Example 1.

Results are given in Table III as items $a$ [poly(p-benzamide) fiber reinforced], $b$ [graphite and poly(p-benzamide) fiber reinforced] and $c$ [graphite fiber reinforced].

The product item $b$ has a modulus at the break that is 2.5 times the tangent modulus used for the flexural strength of item $a$.

EXAMPLE 4

This example illustrates the use of mold-length polycrystalline ceramic fibers of alumina as the inorganic fiber in this invention.

Composites (item $e$ of this example) are made using the wet layup technique of item $b$ of Example 1 but using mold-length polycrystalline ceramic fibers of alumina having an average diameter of about 0.0007 inch, a tensile strength of 140,000 p.s.i. and a tensile modulus of $50 \times 10^6$ p.s.i. The epoxy resin used for item $e$ consists of 10 parts of EPOM 815 (liquid glycidyl ether of bisphenol A diluted with 11% butyl glycidyl ether by Shell Chemical Co.), 9 parts of Nadic® methyl anhydride (a maleic anhydride adduct of methyl cyclopentadiene by Shell Chemical Co.) and 0.1 part of benzyl dimethyl amine as a catalyst. This resin is referred to hereinafter as Type D. The composite is cured for 1 hour at 120° C., then 1 hour at 200° C., removed from the mold and heated at 190° C. for 15 hours. Item $d$ is made with the epoxy resin of Example 1.

Results are given in Table III as items $a$ [poly(p-benzamide) fiber reinforced], $d$ [ceramic and poly(p-benzamide) fiber reinforced], and $e$ [ceramic fiber reinforced]. Item $d$ has a modulus at the break that is 3 times that used to obtain the flexural strength at a tangent modulus of $4 \times 10^6$ p.s.i.

TABLE I

| Item | a | b | c | d | e | f | g | h |
|---|---|---|---|---|---|---|---|---|
| Poly(p-benzamide) fibers, volume percent | 65 | 55.6 | 56.3 | 0. | 70 | 58.2 | 55.0 | 56.8 |
| Inorganic fibers (boron fibers), volume percent | 0 | 4.8 | 9.3 | 59. | 0 | 6.7 | 0.0 | 3.2 |
| Epoxy resin type | A | A | A | A | B | B | C | C |
| Laminate density, lbs./in.$^3$ | 0.0500 | 0.0520 | 0.0543 | 0.0720 | .0497 | .0529 | .0486 | .0507 |
| Flexural strength, p.s.i.$\times 10^{-3}$ | 105 (85) | 227. | 260. | 244. | 93 (80) | 160. | 79 (70) | 156 |
| Flexural strength,* inch$\times 10^{-6}$ | 2.1 (1.7) | 4.4 | 4.8 | 3.4 | 1.9 (1.6) | 3.0 | 1.6 (1.4) | 3.1 |
| Modulus, at break, p.s.i.$\times 10^{-6}$ | 0 | 13. | 19. | 29. | 0 | 16. | 0 | 10. |
| Flexural modulus, p.s.i.$\times 10^{-6}$ | 17. | 17. | 19. | 29. | 16. | 19. | 12. | 15. |
| Maximum strain at break, percent | 1.5 | 1.6 | 1.5 | 0.83 | 1.5 | 1.1 | 1.6 | 1.4 |
| Proportionality limit, p.s.i.$\times 10^{-3}$ | 50 | 128. | 260. | 244. | 42. | 130. | 40 | 61. |

*Flexural strength values in parentheses are calculated as previously described wherein the tangent modulus is about $4 \times 10^{-6}$ p.s.i.

TABLE II

| Item | a | b | c | d | e | f | g |
|---|---|---|---|---|---|---|---|
| Poly(p-benzamide) fibers, volume percent | 65. | 60.1 | 55.5 | 0 | 0 | 58. | 70 |
| Inorganic fibers (glass fibers), volume percent | 0. | 2.1 | 6.6 | 76. | 57.3 | 12. | 0. |
| Epoxy resin type | A | A | A | A | B | B | B |
| Laminate density, lbs./in.$^3$ | .0500 | .0509 | .0509 | .0525 | .0817 | .0724 | .0551 | .0497 |
| Flexural strength,* p.s.i.$\times 10^{-3}$ | 105 (85) | 109 (97) | 148. | 137. | 165. | 143. | 93 (80) |
| Flexural strength,* inch$\times 10^{-6}$ | 2.1 (1.7) | 2.1 (1.9) | 3.5 | 1.7 | 2.3 | 2.6 | 1.9 (1.6) |
| Modulus at break, p.s.i.$\times 10^{-6}$ | 0 | 2 | 5. | | 4. | 7. | 0. |
| Flexural modulus, p.s.i.$\times 10^{-6}$ | 17. | 15. | 12. | 8. | 8. | 12. | 16. |
| Maximum strain at break, percent | 1.5 | 1.9 | 2.1 | 1.8 | 2.7 | 1.6 | 1.5 |
| Proportionality limit, p.s.i.$\times 10^{-3}$ | 50. | 49. | 60. | 110. | 135. | 41. | 42. |

*Flexural strength values in parentheses are calculated as previously described wherein the tangent modulus is about $4 \times 10^{-6}$ p.s.i.

TABLE III

| Item | a | b | c | d | e |
|---|---|---|---|---|---|
| Poly(p-benzamide) fibers, volume percent | 65. | 51.2 | 0 | 57.0 | 0. |
| Inorganic fibers [graphite (band c) and ceramic (d and e) fibers], volume percent | 0. | 11.6 | 65. | 5.0 | 57. |
| Epoxy resin type | A | A | A | A | D |
| Laminate density, lbs./in.$^3$ | .0500 | .0499 | .0491 | .0540 | .0957 |
| Flexural strength,* p.s.i.×10$^{-3}$ | 105 (85) | 105. | 100. | 164. | 35. |
| Flexural strength,* inch×10$^{-6}$ | 2.1 (1.7) | 2.1 | 2.0 | 3.0 | 0.36 |
| Modulus at break, p.s.i.×10$^{-6}$ | 0 | 9. | 16. | 12. | 15. |
| Flexural modulus, p.s.i.×10$^{-6}$ | 17. | 16. | 16 | 15. | 15. |
| Maximum strain at break, percent | 1.5 | 0.77 | 0.65 | 1.4 | |
| Proportionality limit, p.s.i.×10$^{-3}$ | 50 | 72 | 100. | 92. | 35. |

*Flexural strength values in parentheses are calculated as previously described wherein the tangent modulus is about 4×10$^{-6}$ p.s.i.

EXAMPLE 5

This example illustrates the effect of the volume percent of the inorganic fiber on particular flexural properties of the composite.

Figure 4:
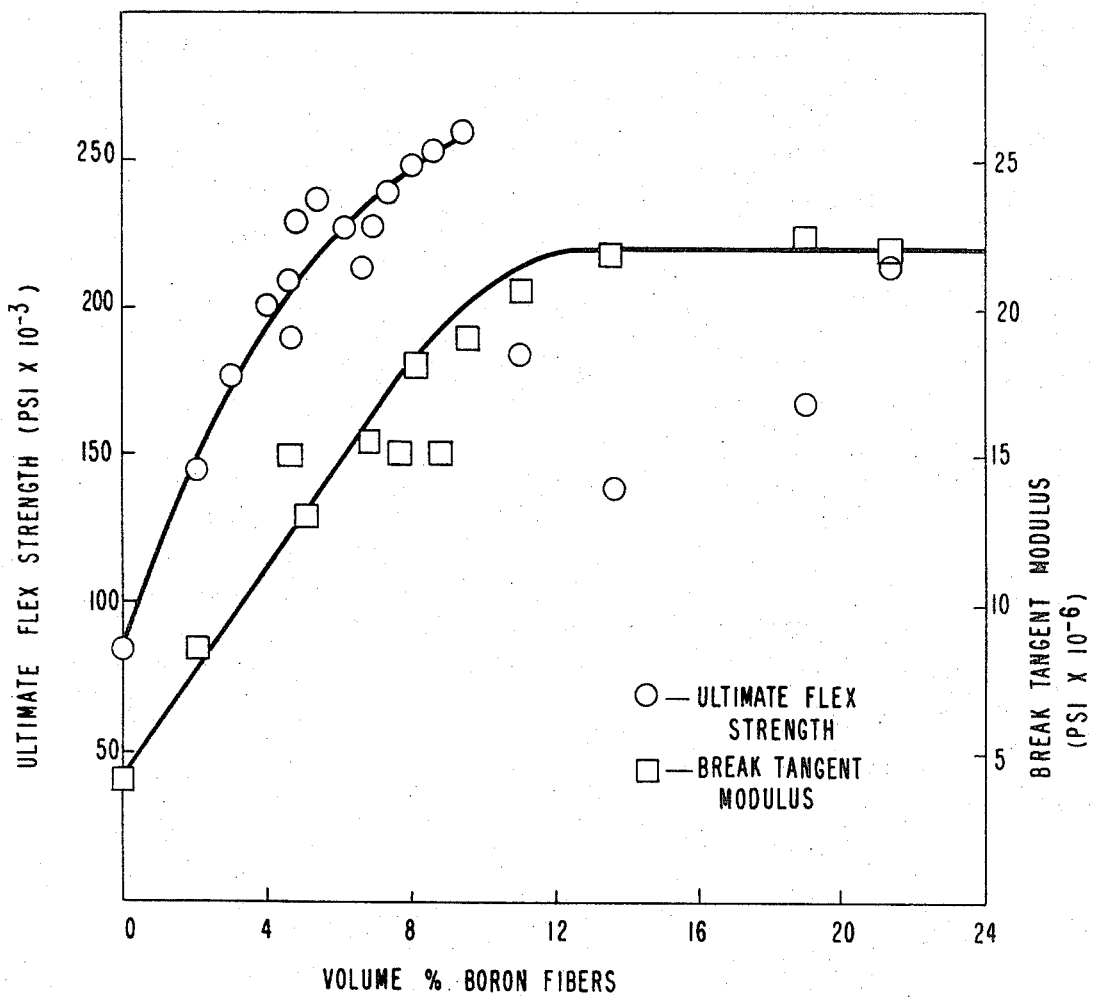
FIG. 4 illustrates the effect of the volume percent of the inorganic fiber on particular flexural properties of the composites.

Cured epoxy resin composites are prepared placing various volume percentages of boron fibers in the portion of the composite which will be subjected to compression, together with sufficient poly(p-benzamide) fibers to have a total fiber volume of 60 to 70 percent, all as described in Example 1. The ultimate flex strength and the break tangent modulus for the various volume percentages are shown in FIG. 4. As this data indicates, less than about 12 volume percent surprisingly increases these properties, and larger amounts do not result in any further significant increase.

What is claimed is:
1. A reinforced composite comprising:
   (A) at least about 10 volume percent of resin,
   (B) at least about 38 volume percent of high strength, high modulus carbocyclic aromatic polyamide fibers which have a tenacity of at least 10 grams per denier, a tensile modulus of at least 600 grams per denier and an orientation angle less than about 45°, and
   (C) about 2 to 12 volume percent of high strength, high modulus inorganic fibers, wherein said inorganic fibers are located within the portions of said composite thereof which will be subjected to compressive stress.

2. Composite of claim 1 wherein the polyamide fiber/inorganic fiber (volume/volume) ratio is from about 4:1 to 30:1.

3. Composite of claim 2 wherein said ratio is from about 5:1 to 11:1.

4. Composite of claim 1 comprising:
   (A) 20 to 40 volume percent of said resin which is a synthetic resin,
   (B) 50 to 80 volume percent of said polyamide fibers, and
   (C) 3 to 10 volume percent of said inorganic fibers which have a tensile strength of at least 50,000 p.s.i. and a tensile modulus of at least 10×10$^6$ p.s.i.

5. Composite of claim 1 wherein said resin is an epoxy resin.

6. Composite of claim 1 wherein said polyamide fibers are poly(p-benzamide) fibers.

7. Composite of claim 1 wherein said inorganic fibers are boron fibers.

8. Composite of claim 1 wherein said inorganic fibers are glass fibers.

9. Composite of claim 1 wherein said inorganic fibers are graphite fibers.

10. Composite of claim 1 wherein said inorganic fibers are ceramic fibers.

11. Composite of claim 1 in the form of a rectangular bar having a flexural strength of at least 150,000 p.s.i. and a flexural modulus of at least 12×10$^6$ p.s.i.

12. Composite of claim 1 wherein the said inorganic fibers are located within the said composite where they will be subjected to compression along their axes when the said composite is loaded.

References Cited

UNITED STATES PATENTS

| | | | |
|---|---|---|---|
| Re. 26,731 | 2/1969 | Robinson | 161—57 |
| 2,758,951 | 8/1956 | Case | 161—142X |
| 2,827,414 | 3/1958 | Bussard et al. | 161—91X |
| 2,836,529 | 5/1958 | Morris | 161—90X |
| 3,063,883 | 11/1962 | Brissette | 161—170X |
| 3,395,744 | 8/1968 | Wolf et al. | 161—91X |
| 3,466,219 | 9/1969 | Schwartz | 161—57 |

OTHER REFERENCES

"Greater Stiffness for RP," Modern Plastics, December 1967, pp. 122, 123.

ROBERT F. BURNETT, Primary Examiner

R. H. CRISS, Assistant Examiner

U.S. Cl. X.R.

161—143, 144, 152, 170, 176